Dec. 3, 1968    W. J. SACKETT, SR    3,414,173
MATERIALS CONDITIONING, WEIGH BLENDER SYSTEM
Filed Feb. 24, 1966    4 Sheets-Sheet 1

INVENTOR
Walter J. Sackett, Sr.
BY Walter G. Finch
ATTORNEY

INVENTOR
Walter J. Sackett, Sr.

BY Walter G. Finch
ATTORNEY

United States Patent Office 3,414,173
Patented Dec. 3, 1968

3,414,173
MATERIALS CONDITIONING, WEIGH
BLENDER SYSTEM
Walter J. Sackett, Sr., 3700 Echodale Ave.,
Baltimore, Md. 21206
Filed Feb. 24, 1966, Ser. No. 529,680
1 Claim. (Cl. 222—506)

ABSTRACT OF THE DISCLOSURE

This invention relates to a compact batching plant for compounding, mixing, and delivering granular materials. A hopper is supported in a lever arrangement for an overhead beam scale. The hopper has vertical divider plates and a truncated V lower portion. The bottom is open except for an elongated inverted V divider to comprise a pair of spaced parallel ports.

These ports open and close simultaneously in clam shell fashion by means of arcuate gates having mutual gear sectors and a hydraulic actuator.

---

This invention relates generally to gravity type mixers, and more particularly it pertains to a conditioning weigh blender apparatus for delivering mixed products. This invention is an improvement over the invention disclosed in my copending U.S. patent application Ser. No. 377,340 filed June 23, 1964, now Patent No. 3,259,375, entitled "Compounding and Blending Apparatus."

There are many products in commerce which comprise mixtures of ingredients in various proportions to order. Plant foods, including chemical fertilizers, for example, are made up of several chemicals and designated by numbers such as 5–10–5 indicating the constituent proportions. To meet the demand for various formulas, it is desirable to compound the mix directly for the customer to order rather than attempting to stock a great variety of mixes.

In the present practice, a steady flow compounding plant requires lofty elevating, screening, pulverizing, and blending means as well as expensive multi-story tower areas for housing the equipment. On the other hand, batch plants at present require altogether too much handling of materials in process using the usual individual small capacity machines.

Accordingly, it is an object of this invention to provide a batch compounding and conditioning apparatus which automatically receives and weighs the various constituents of a mix product, thoroughly combines them, and delivers the product ready for use in a simple efficient manner.

A still further object of this invention is to provide a conditioning weigh blender system in which materials can be conditioned, weighed, blended, and delivered directly to further processing equipment.

And still another object of this invention is to provide a conditioning weigh blender system in which materials can be conditioned, weighed, blended and delivered directly to vehicles for further shipment, including superphosphates and pre-mixed goods.

Still another object of this invention is to provide a batching hopper having a divided bottom and a pair of spaced gates therein whereby the opposite opening of same will cause converging and recombining streams of material to form.

Another object of this invention is to provide a novel conditioning and blending system which compounds a mix directly, thus eliminating the need for stocking a great variety of mixes.

Still another object of this invention is to provide a well co-ordinated, combining and conditioning apparatus wherein simplified equipment is featured, expensive building enclosures are eliminated and handling of materials and product are reduced to a minimum.

Still another object of this invention is to provide to related manufacturing processes not described, the easy adaption of a conditioning, compounding, and blending plant to predetermined rate flow by simply automatically timing the actuation of the gates and operating the conveyer with a variable speed driving means thus to almost completely automate the operation.

Other objects and advantages of this invention will become more readily apparent and understood from the following detailed specification and accompanying drawings in which.

Figure 1:
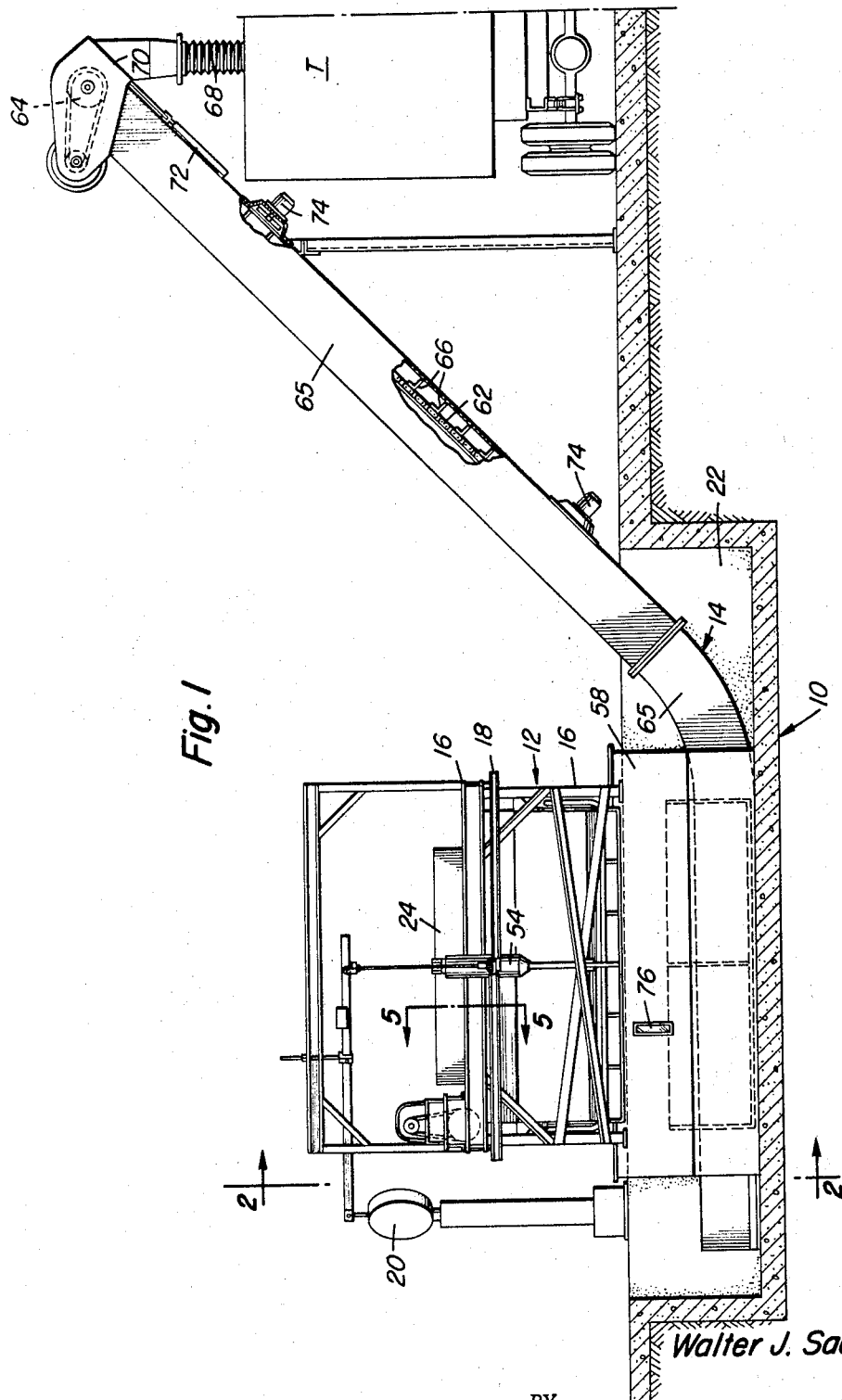
FIG. 1 is a side elevation, partly in section and partly broken away, of a material blending conditioner and loader arrangement incorporating features of this invention.
Figure 2:
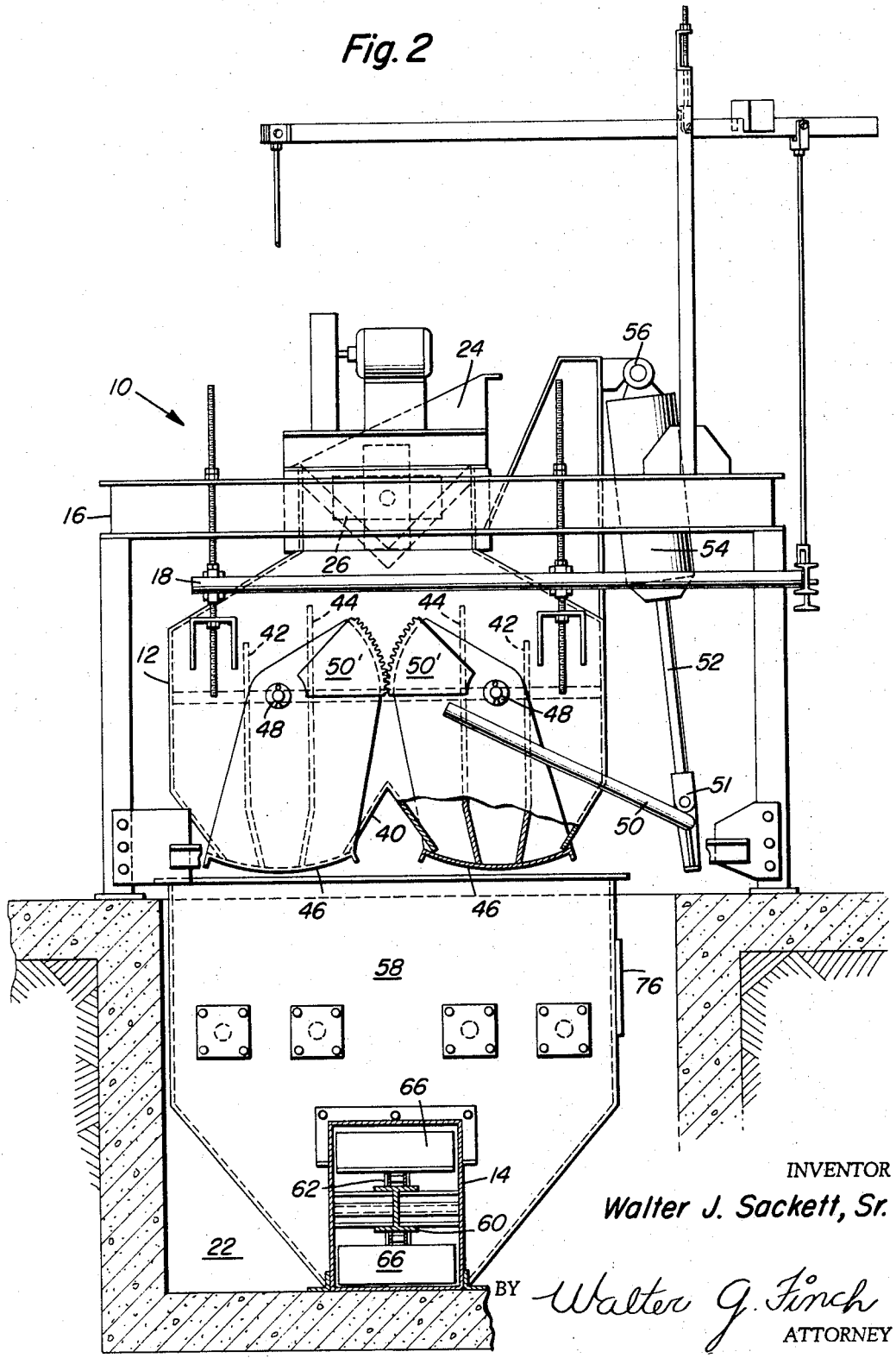
FIG. 2 is an enlarged end elevation thereof taken on line 2—2 of FIG. 1.
Figure 4:
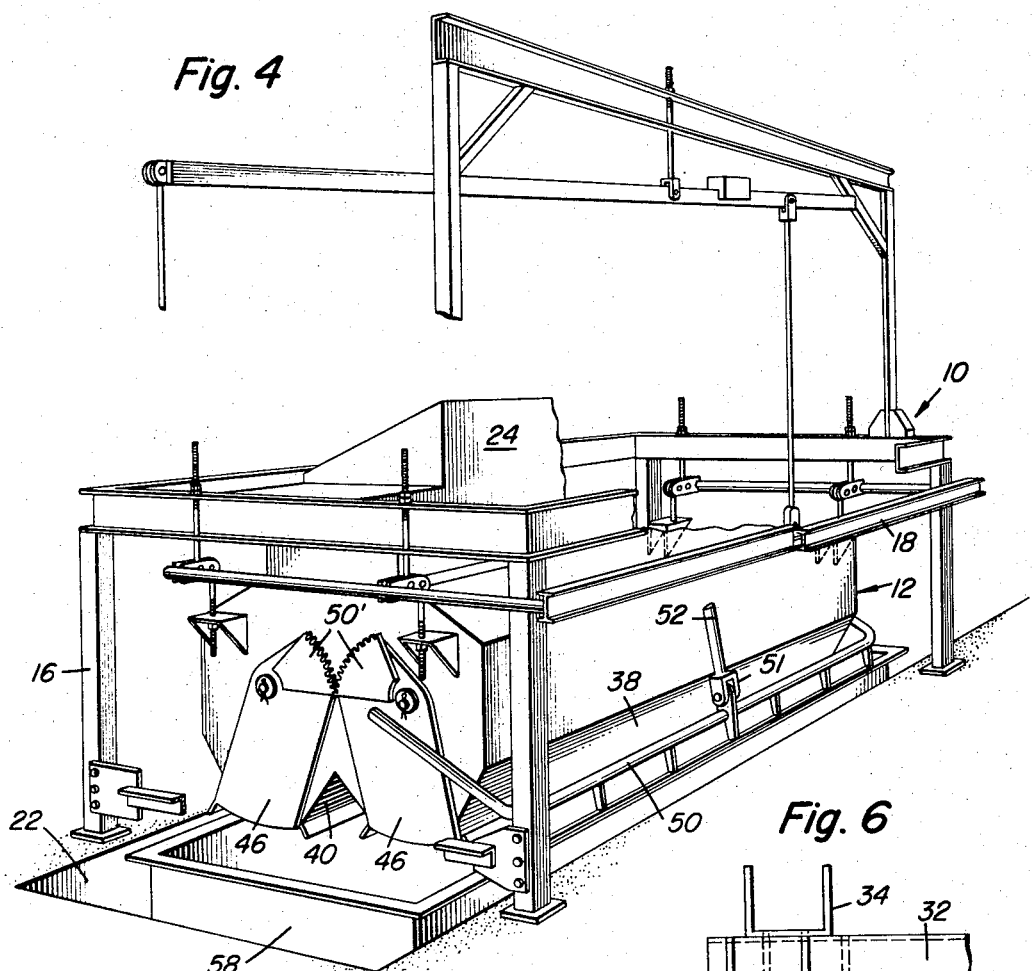
FIG. 4 is a perspective view showing additional details of the suspension arrangement and of the gates for the hopper.

Referring now to the details of the invention as shown in FIGS. 1, 2, and 4 of the drawings, reference numeral 10 indicates generally a material blending machine. This machine 10 is made up of two basic assemblies, a batching hopper assembly 12 and a mixing loader assembly 14.

The batching hopper assembly 12 is entirely suspended from a support structure 16 on a splice-arm twister frame 18 which is linked to a weigh scale 20.

The mixing loader assembly 14 extends from a pit 22 beneath the support structure 16 and rises at an angle of about 45 degrees to an elevation suitable for loading bulk shipment vehicles T. Mixing functions of this loader assembly 14 will be further described.

A transverse section of the batching hopper assembly 12 as best shown in FIGS. 2 and 4 is of a squat flask-shape with a relatively narrow open neck portion 24. In this neck portion 24, there is mounted a conditioner assembly 26 comprising a V-shaped grating 28 and a bladed rotor assembly 30.

Figure 6:
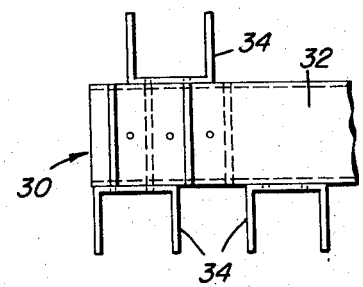
FIG. 6 is a view depicting details of the breaker rotor for the conditioner.
Figure 5:
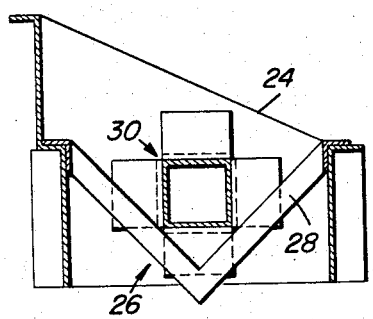
FIG. 5 is a detailed cross section view of the breaker conditioner taken on line 5—5 of FIG. 1.

As best shown in FIGS. 5 and 6, the rotor assembly 30 is constructed on a square shaft 32 by securing thereto short lengths of blades 34 of structural U beam so located as to intersect the spaces of grating 28. A motor drive is employed to rotate the shaft 32, thus causing the blades 34 in conjunction with the grating 28 to break up any lumps of material introduced into the neck portion 24.

The batching hopper assembly 12 operates on an overflow principle to subdivide the various ingredients of a batch of material. For this purpose, the bottom of the hopper flask 38 tapers inwardly at the sides and has an upwardly extending inverted V crease 40 along the median line as shown in FIG. 2. Also there are spaced vertical partitions 42 and 44 on each side running the length of the flask 38, the higher partitions 44 the pairs being inwardly of the lower partitions 42. Each pair of partitions 42, 44 converges toward an acruate gate 46 which closes the bottom of the flask 38 in each side of the crease 40.

Figure 3:
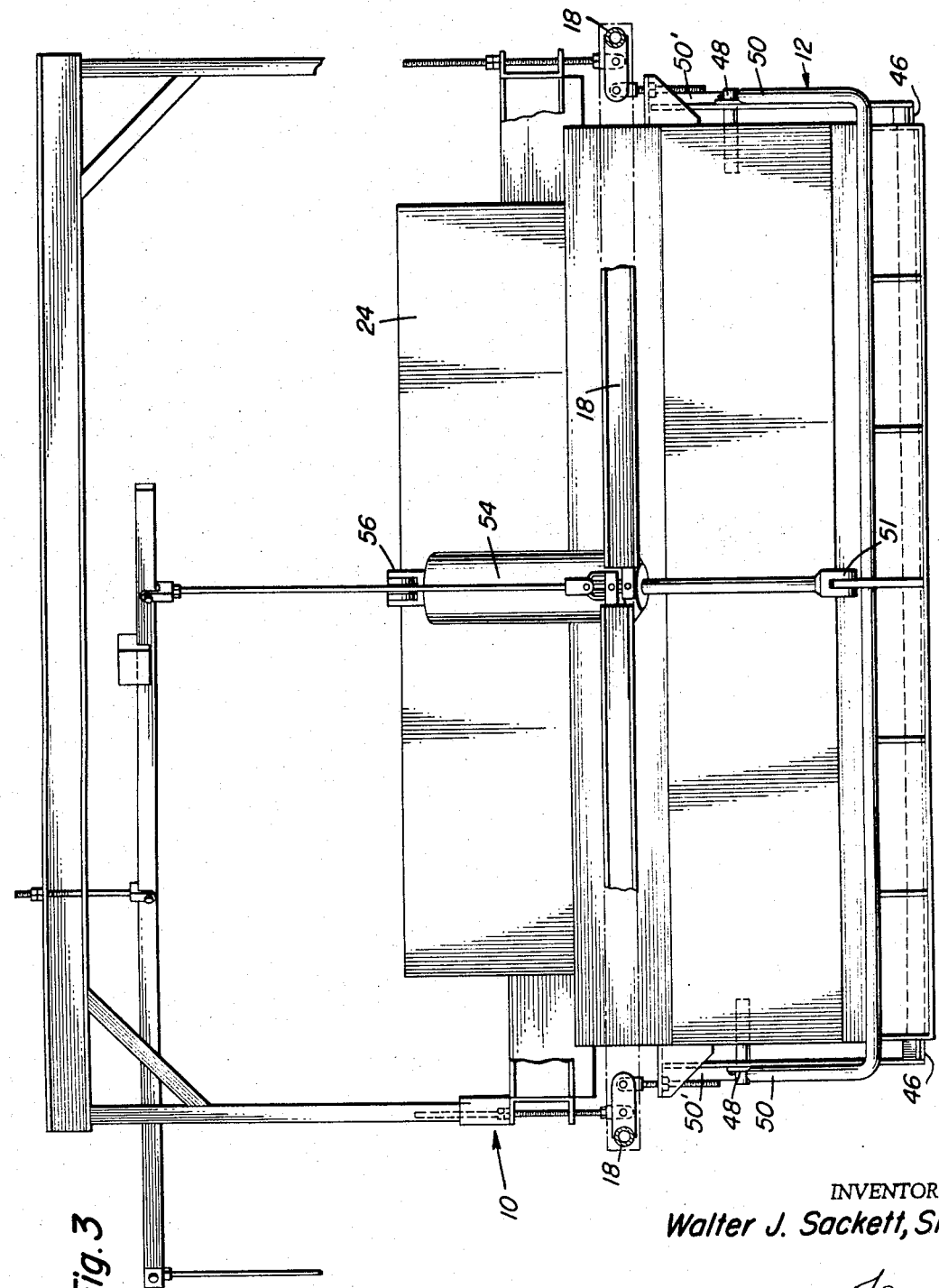
FIG. 3 is a side view showing the suspended breaker conditioner and an associated hopper.

These gates 46 extend the entire length of the flask 38 and are hung and pivot on journals 48. A pair of meshed gear sectors 50 operationally join the gates 46 together. One of the gates 46 is provided with a U-shaped actuator arm 50 joining its ends external to the flask 38 as best shown in FIG. 3. This actuator arm 50 has a clevis 51 intermediate its ends which is coupled to the piston rod 52 of an air cylinder 54 secured to the hopper assembly 12 on a pivot 56.

When air under pressure is introduced to one side of the cylinder 54, the actuator arm 50 is raised causing the gates 46 to swing oppositely and open up the bottom of the flask 38. The subdivided material in the partitioned spaces therein is allowed to dump in two separate converging streams into a receiving hopper 58 in the pit 22.

This hopper 58 has sides which converge toward the lower horizontal end of the mixing loader assembly 14 at an open sided section thereof so introduced material envelops a chain guide 60 and an endless chain 62. The chain 62 is driven by a motor operated sprocket 64 at the top end of the mixing loader assembly 14 and returns over another sprocket (not shown) in the opposite end.

The curved and the upwardly extending portions of the loader assembly 14 are encased in a rectangular cross section ducting 65 and lateral paddles 66 spaced on the chain 62 scrape along the bottom and carry material upward as they travel.

A discharge spout 68 depends from the upper end of the loader assembly 14 and is flexible so the material discharging therefrom may be directed into the corners of the shipping vehicle T. If desired, the flow may be interrupted by closing a sliding exit gate 70 by means of an air cylinder 72. A plurality of agitating motors 74 built into the ducting of the loader assembly 14 prevent compacting of material and aid in further mixing of the ingredients thereof.

A sight glass 76 in the side of the receiving hopper 58 permits the operator to assay the load condition within before opening the gates 46.

Obviously many modifications and variations of the present invention are possible in light of the above teachings. It is, therefore, to be understood that within the scope of the appended claim the invention may be practiced otherwise than as specifically described.

What is claimed is:
1. Apparatus for blending granular material, comprising a rectilinear hopper having a relatively narrow inlet medianly of its top for receiving said granular material and a narrowed bottom including a pair of discharge outlets opposed at the sides of the bottom separated by an upwardly extending crease between the said outlets, gate means for closing all of said discharge outlets operatively engaged, means simultaneously opening each said gate means, and a plurality of substantially vertical partitions positioned above each said outlet within said hopper for subdividing it into compartments for said granular material, the partitions more central of the hopper being higher than the outer partitions, each said partitions terminating at said gate means so that granular material in said compartments is discharged simultaneously upon the opening of said gate means.

References Cited

UNITED STATES PATENTS

| | | | |
|---|---|---|---|
| 930,742 | 8/1909 | DeMaio | 241—90 |
| 1,442,137 | 1/1923 | Falkiner | 222—429 |
| 1,511,279 | 10/1924 | Jackson | 110—101 |
| 1,512,223 | 10/1924 | Hitchcock | 214—35 X |
| 1,534,855 | 4/1925 | Lowenthal | 241—224 X |
| 1,870,432 | 8/1932 | Witter | 198—57 |
| 2,155,374 | 4/1939 | Hartog | 241—101 X |
| 2,246,354 | 6/1941 | Garlinghouse | 222—503 |
| 2,642,206 | 6/1953 | Reed | 222—429 |
| 3,226,042 | 12/1965 | Adamski, et al. | 241—224 X |
| 3,233,873 | 2/1966 | Sackett | 198—174 X |

ANDREW R. JUHASZ, *Primary Examiner.*

FRANK T. YOST, *Assistant Examiner.*